US006584289B2

(12) United States Patent
Rejewski et al.

(10) Patent No.: US 6,584,289 B2
(45) Date of Patent: Jun. 24, 2003

(54) METHOD AND APPARATUS FOR SETTING TRANSFER ROLLER ENGAGEMENT

(75) Inventors: Robert S. Rejewski, Brockport, NY (US); Kenneth Friedrich, Honeoye, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/873,469

(22) Filed: Jun. 4, 2001

(65) Prior Publication Data

US 2002/0181977 A1 Dec. 5, 2002

(51) Int. Cl.[7] .......................... G03G 15/00; G01L 5/04

(52) U.S. Cl. ................. 399/9; 73/862.391; 73/862.451; 198/810.04; 399/162; 399/165; 399/313

(58) Field of Search ................................ 399/126, 121, 399/9, 31, 411, 313, 303, 162, 163, 165; 198/804, 806, 808, 810.01, 810.04; 73/862.451, 862.391

(56) References Cited

U.S. PATENT DOCUMENTS 3,715,027 A * 2/1973 Fujimoto .................... 198/806
3,720,100 A * 3/1973 Grunbaum ............. 73/862.451
3,910,522 A * 10/1975 Lee et al.
4,480,487 A * 11/1984 Kunzfeld
4,587,855 A * 5/1986 Yamada et al. ........ 73/862.451
4,627,702 A * 12/1986 Anderson .................. 399/165
5,518,457 A * 5/1996 Seki et al.
6,085,053 A * 7/2000 Saeki ......................... 399/165
6,088,559 A * 7/2000 Costanza et al. ...... 198/810.04
6,137,974 A * 10/2000 Williams et al. ....... 198/810.04
6,321,052 B1 * 11/2001 Yamashina et al. ......... 399/165
6,445,895 B2 * 9/2002 Shirasawa et al. .......... 399/121

FOREIGN PATENT DOCUMENTS

DE 3616561 A1 * 11/1987

* cited by examiner

*Primary Examiner*—Susan S. Y. Lee

(57) ABSTRACT

An apparatus for measuring the deflection of a belt in an electrophotographic printing machine includes an elongate arm member having a first end and a second end. The second end engages and is displaced by the belt. A gearbox includes a plurality of gears interconnected into a gear arrangement, and a gearbox shaft rotatable by the gear arrangement. The second end of the arm member is coupled to the gear arrangement, which converts displacement of the second end of the arm member to rotation of the gearbox shaft. An encoder is associated with the gearbox shaft. The encoder includes at least one encoder output. The encoder senses rotation of the gearbox shaft and issues electrical pulses on the encoder output. The electrical pulses are indicative of the magnitude and direction of the rotation of the gearbox shaft. A counter includes at least one counter input and at least one counter output. The counter input is electrically connected to the encoder output. The counter counts the electrical pulses and activates the counter output based at least in part upon the electrical pulses.

13 Claims, 3 Drawing Sheets

METHOD AND APPARATUS FOR SETTING TRANSFER ROLLER ENGAGEMENT

FIELD OF THE INVENTION

The present invention relates generally to a device for setting transfer roller engagement in an electrophotographic printing machine.

DESCRIPTION OF THE RELATED ART

Generally, the process of electrophotographic printing and/or copying includes charging a photoconductive surface to a substantially uniform potential or voltage. The charged photoconductive surface is then exposed to record an electrostatic latent image thereon, which corresponds to an original document to be copied. Thereafter, a developer material is brought into contact with the latent image. The developer material attracts toner particles onto the latent image carried by the photoconductive surface. The resultant image is then transferred from the photoconductive surface onto a copy sheet, to which it is subsequently bonded.

In electrophotographic printing machines, such as printers and copiers, the photoconductive surface is typically carried by an electrically conductive substrate in the form of a conveyor belt or endless loop belt. Drive rollers engage the belt on the side thereof opposite the photoconductive surface. The drive rollers convey the belt carrying the photoconductive surface sequentially through stations within the electrophotographic printing machine that perform the various functions referred to above, i.e. charging, exposing, developing and transferring. To enable the drive rollers to convey the belt, tension is applied to the belt by tensioning rollers. A transfer roller is typically used to transfer the latent image from the photoconductive surface to the copy sheet.

The copy sheet is carried on the photoconductive surface of the belt and under the transfer roller. In order to ensure high-quality transfer of the latent image onto the copy sheet, the transfer roller engages the tensioned belt with a transfer force of a specified magnitude and directed generally perpendicular to the belt. As the copy sheet is carried under the transfer roller, this force presses the copy sheet against the photoconductive surface, and the latent image is transferred. The transfer force with which the transfer roller engages the belt displaces the belt in the direction of the force. The amount of this displacement is often measured to determine whether the transfer roller is engaging the belt with the specified force. This displacement measurement is often referred to as setting the transfer roller engagement.

Conventionally, the transfer roller engagement is measured with a linear variable differential transformer and an electrical interface board. However, as electrophotographic machines have become smaller in size, the space available for the equipment to measure the transfer roller engagement has become increasingly constrained. The relatively-large physical size of conventional equipment used to measure the transfer roller engagement have rendered their use incompatible with the latest generation of electrophotographic printing machines.

Therefore, what is needed in the art is a transfer roller engagement measuring device that is substantially more compact than conventional transfer roller engagement measuring devices.

SUMMARY OF THE INVENTION

The present invention provides an apparatus and method for measuring the deflection of a belt in an electrophotographic printing machine.

The invention comprises, in one form thereof, an elongate arm member having a first end and a second end. The second end engages and is displaced by the printing machine belt. A gearbox includes a plurality of gears interconnected into a gear arrangement, and a gearbox shaft coupled to the gear arrangement. The second end of the arm member is coupled to the gear arrangement, which converts displacement of the second end of the arm member to rotation of the gearbox shaft. An encoder is associated with the gearbox shaft. The encoder includes at least one encoder output. The encoder senses rotation of the gearbox shaft and issues electrical pulses on the encoder output. The electrical pulses are indicative of the direction and magnitude of the rotation of the gearbox shaft. A counter includes at least one counter input and at least one counter output. The counter input is electrically connected to the encoder output. The counter counts the electrical pulses and activates the counter output based at least in part upon the electrical pulses.

An advantage of the present invention is that it is substantially more compact than conventional transfer roller engagement measuring devices, and can therefore be used with the most advanced and modem electrophotographic printing machines.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE DRAWINGS

Figure 1:
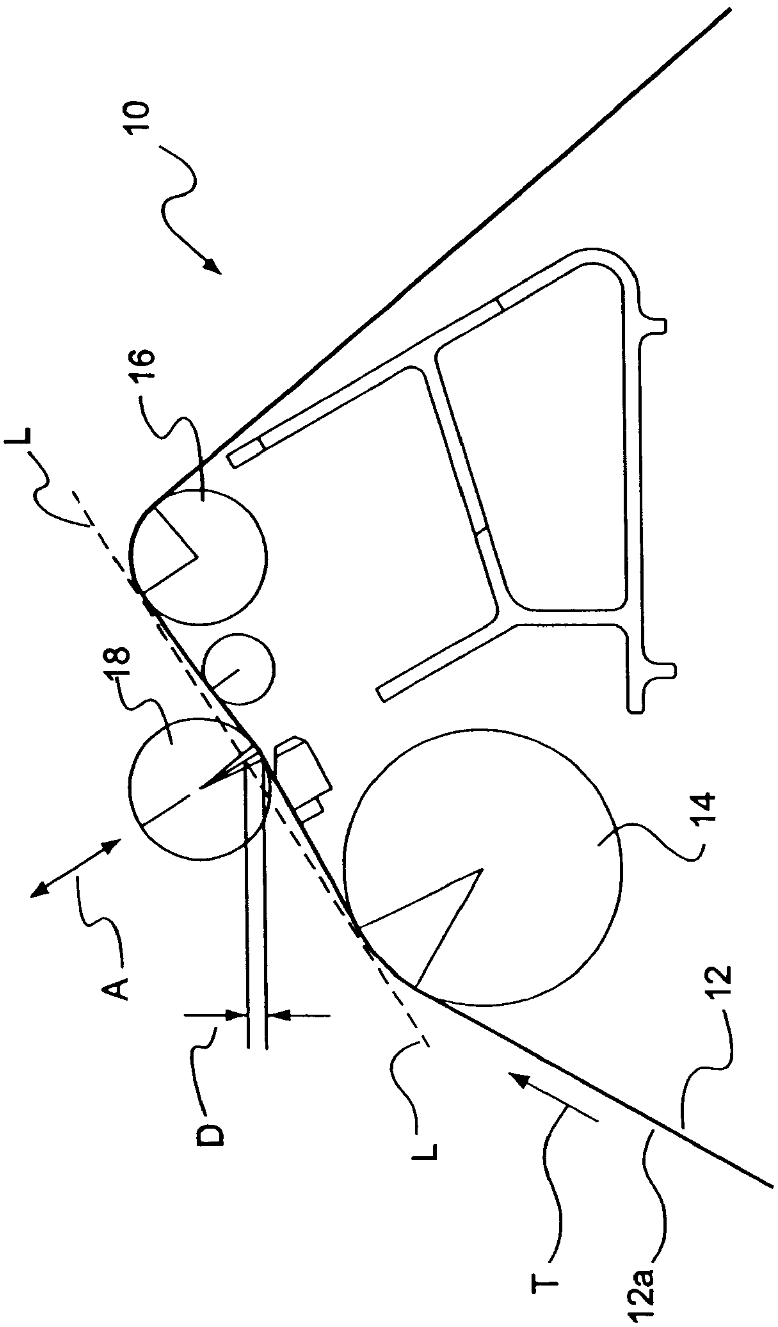
FIG. 1 is a side view of an electrophotographic printing machine having one embodiment of an electromechanical measurement instrument of the present invention.

Referring now to the drawings, and particularly to FIG. 1, there is shown an electrophotographic printing machine including one embodiment of the electro-mechanical measurement instrument of the present invention. Electrophotographic printing machine 10, such as, for example, a copier or printer, includes belt 12, film tracking roller 14, 16, transfer roller 18 and transfer roller engagement measuring device 20.

Generally, belt 12 is configured as a continuous or endless loop, and has an electrically conductive substrate and a photoconductive surface 12*a*. Belt 12 is engaged and driven in direction of travel T by film tracking rollers 14, 16. One or more tensioning rollers (not shown) keep belt 12 under tension, and thus in frictional engagement with film tracking rollers 14, 16.

Film tracking 14, 16 engage belt 12 on the side thereof that is opposite photoconductive surface 12*a*. Film tracking rollers 14, 16 are driven to rotate by one or more motors, such as electric motors (not shown). Film tracking rollers 14, 16 frictionally engage belt 12, such that rotation of film tracking rollers 14, 16 is transferred to motion of belt 12 in direction of travel T.

Transfer roller 18 engages photoconductive surface 12*a* of belt 12, on the side thereof that is opposite film tracking rollers 14, 16. The position of transfer roller 18 relative to belt 12 is adjustable in adjustment direction A, i.e., toward and away from belt 12 and in a direction that is generally perpendicular thereto. The position of transfer roller 18 relative to belt 12 is set such that transfer roller 18 engages belt 12 with a predetermined or specified force. The predetermined force applied by transfer roller 18 displaces belt 12 from zero line L, shown as a dashed line tangential to the outside surface of each of film tracking rollers 14, 16, such that belt 12 is deflected from zero line L by a predetermined or specified deflection distance D. Line L thus represents the position belt 12 occupies under a zero displacement or zero applied force condition, and deflection distance D corresponds to and provides a convenient measurement of the amount of force with which transfer roller 18 engages belt 12.

Figure 2:
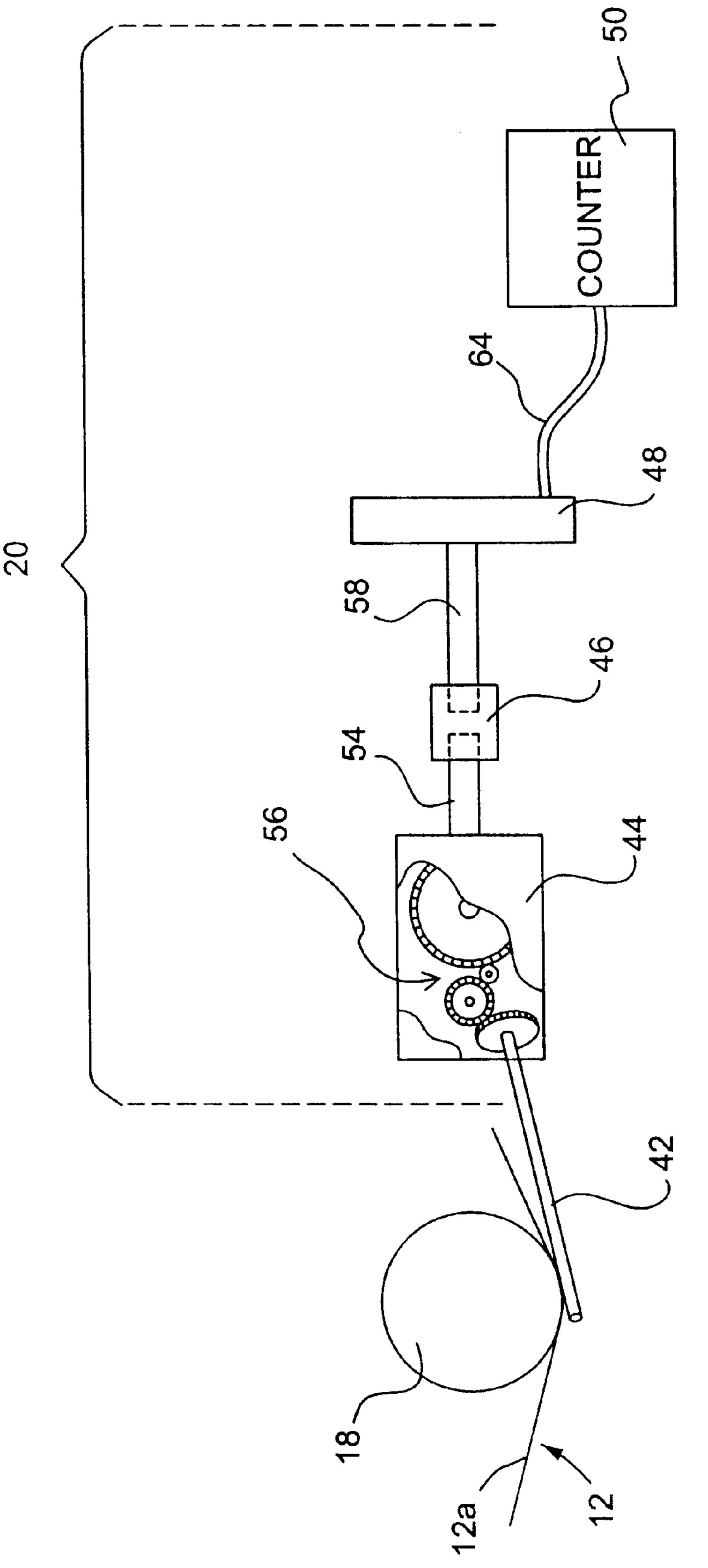
FIG. 2 is a schematic view of the electromechanical measurement instrument of FIG. 1.

Transfer roller engagement measuring device 20 (hereinafter measuring device 20) is disposed proximate belt 12. Referring now to FIG. 2, measuring device 20 includes deflection lever arm 42, gearbox 44, coupler 46, optical encoder 48 and counter 50.

Deflection lever arm 42 is an elongate arm member having a first end coupled to gearbox 44 and a second end disposed in association with belt 12. More particularly, the second end of deflection lever arm 42 engages the backside of belt 12, i.e., the side opposite conductive surface 12*a*, at a point thereon that is opposite transfer roller 18. Deflection lever arm 42 engages belt 12 in such a manner that the travel of belt 12 in direction of travel T does not substantially displace or deflect deflection lever arm 42. Displacement or deflection of belt 12 in adjustment direction A, however, causes a corresponding displacement of the second end of deflection lever arm 42. First end of deflection lever arm 42 includes counterbalancing means, such as, for example, a weight coupled thereto, to thereby prevent any displacement of the second end of deflection lever arm 42 due to its own weight.

Gearbox 44 includes gearbox shaft 54 and gear arrangement 56. The first end of deflection lever arm 42 is coupled to gear arrangement 56. As will be described more particularly hereinafter, gearbox 44 converts the displacement of the second end of deflection lever arm 42 in adjustment direction A to rotary motion of gearbox shaft 54 in a corresponding direction. Gear arrangement 56 includes a plurality of gears that are interconnected in a known manner that provides a mechanical advantage. The displacement of the second end of deflection lever arm 42 in adjustment direction A is effectively amplified by the mechanical advantage and transferred to rotation of gearbox shaft 54. The mechanical advantage provided by gear arrangement 56 is, for example, approximately ten to approximately one-hundred times.

Coupler 46, in a conventional manner, mechanically couples gearbox shaft 54 to output shaft 58. Thus, gearbox shaft 54 and output shaft 58 rotate as substantially one body, rotation of gearbox shaft 54 being transferred by coupler 46 to rotation of output shaft 58.

Optical encoder 48 is of conventional construction, such as, for example, a Danapar Series E11 disc encoder. However, it is to be understood that virtually any commercial optical encoder having 1024 pulses per revolution, and 2 channels, can be used. Optical encoder 48 is associated with output shaft 58, and is electrically coupled to an electrical power source (not shown). Optical encoder 48 includes encoder outputs 48*a*, 48*b* and marker output 48*c*. Each of encoder outputs 48*a*, 48*b* issue electrical pulses that are phased relative to each other. The phasing of the electrical pulses of encoder outputs 48*a*, 48*b* are indicative of the direction of rotation of output shaft 58. For example, the electrical pulses on encoder output 48*a* lead the electrical pulses on encoder output 48*b* as output shaft 58 rotates in a counter-clockwise direction. Each encoder output 48*a*, 48*b* issues 1,024 (one-thousand twenty four) electrical pulses per 360° (three-hundred and sixty degrees) of rotation of output shaft 58. As is described more particularly hereinafter, encoder outputs 48*a*, 48*b* and 48*c* are electrically connected to corresponding inputs of counter 50.

Figure 3:
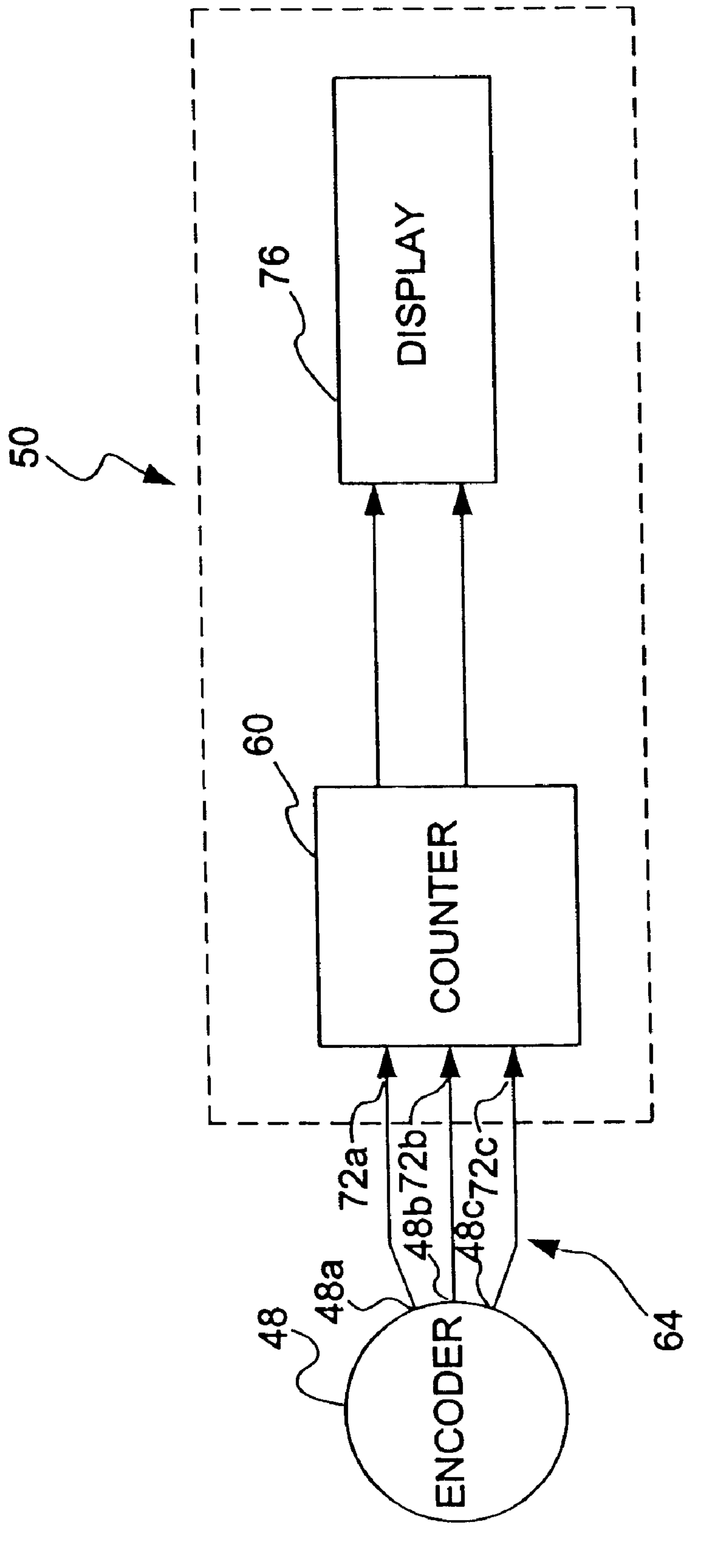
FIG. 3 is a schematic view of the interconnections of the encoder and counter of FIG. 2.

Counter 50 is a conventional programmable counter/decoder device, such as, for example, Position Indicator Model No. A103-002, manufactured by the Veeder-Root Company, a Danaher Corporation Company. Counter 50 is electrically connected to encoder 48 by electrical cable 64. More particularly, and with reference to FIG. 3, counter 50 includes counter/interface circuit 60, which performs the counting function and includes conventional interface circuitry. Counter 50 includes counter inputs 72*a*, 72*b* and marker input 72*c*. Counter inputs 72*a*, 72*b* are electrically connected to encoder outputs 48*a*, 48*b*, respectively, and marker input 72*c* is electrically connected to marker output 48*c* of encoder 48. Counter 50 further includes high limit output 74*a* and low limit output 74*b*. Counter 50 includes display 76 that displays a number corresponding to the pulses received or counted by counter/interface circuitry 60. The actual number displayed on display 76 is optionally the number of pulses received by counter 50 multiplied by a user-programmable calibrating factor.

In use, measuring device 20 is disposed within printing machine 10 and proximate to, but somewhat remotely from, the area adjacent the underside of belt 12 opposite transfer roller 18. This area is relatively tightly-constrained in terms of available space for a measuring device due to the density of modem electrophotographic printing machines. It is only necessary to dispose the second end of deflection lever arm 42 in this constrained area. The remainder of measuring device 20 is disposed proximate to, but remotely from, the constrained area adjacent the underside of belt 12 opposite transfer roller 18. Since it is only necessary to dispose the second end of deflection lever arm 42 in this constrained area, measuring device 20 is compatible for use in such space-constrained areas and with such modem electrophotographic printing machines.

As stated above, zero deflection line L represents the position belt 12 occupies under a zero displacement or zero applied force condition, and deflection distance D corresponds to and provides a convenient measurement of the amount of force with which transfer roller 18 engages belt 12. During initial set-up or subsequent adjustment of printing machine 10, a user or technician adjusts the position of transfer roller 18 relative to belt 12 to thereby ensure transfer roller 18 engages belt 12 with the appropriate or specified force. More particularly, the position of transfer roller 18 is adjusted in a direction toward or away from zero deflection line L until transfer roller 18 deflects belt 12 by a specified amount. As is more particularly described hereinafter, the position of belt 12 relative to zero deflection line L, and thus the amount by which transfer roller 18 displaces belt 12, is indicated by measuring device 20.

As belt 12 is deflected or displaced in adjustment direction A, the second end of deflection lever arm 42 is likewise and correspondingly displaced. Gearbox 44, via the gear arrangement, mechanically amplifies the deflection of lever arm 42 and converts this deflection to rotation of output shaft 58. More particularly, transfer roller 18 engages and deflects belt 12 and, thus, the second end of deflection lever arm 42. In the case of belt 12 and deflection lever arm 42 being displaced in adjustment direction A and away from transfer roller 18, gearbox shaft 54 rotates, for example, in a counter-clockwise direction. Output shaft 58 is coupled to gearbox shaft 54, and rotates as substantially one body therewith. Thus, output shaft 58 also rotates in, for example, a counter-clockwise direction. Optical encoder 48 is associated with, and senses the rotation of, shaft 54. As shaft 54 rotates in, for example, the counter-clockwise direction, encoder outputs 48*a*, 48*b* issue a plurality of phased electrical pulses. Encoder outputs 48*a*, 48*b* are electrically connected to counter inputs 72*a*, 72*b*, respectively, of counter 50. The number of electrical pulses and the relative phase thereof are received and counted by counter 50. Display 70 displays the number of electrical pulses received, as optionally modified by any preprogrammed calibrating factor.

Counter 50 optionally multiplies the number of pulses counted by a programmable calibrating factor, and displays on display 70 the resultant or calibrated number. Thus, counter 50 is programmable to display, for example, the deflection in adjustment direction A of belt 12 in units of thousandths of an inch. The calibration factor is calculated dependent at least in part upon the length of deflection lever arm 42 and the mechanical advantage (i.e., gear ratio) of gearbox 44. For example, deflection lever arm 42 is approximately seven inches in length and the mechanical advantage/gear ration of gearbox 44 is from approximately 60:1 to approximately 80:1. Thus, encoder 48 issues from approximately two to approximately four pulses per each thousandth of an inch deflection of deflection lever arm 42.

In the embodiment shown, counter 50 includes an integral display 76. However, it is to be understood that the counter can be alternately configured, such as, for example, without an integral display and being electrically connected to a separate non-integral display.

In the embodiment shown, counter 50 is resettable through a button (not shown) on the front panel thereof. However, it is to be understood that the counter can include reset inputs or marker inputs which reset the counter to zero, and enable the counter and measuring device 10 to be interfaced with and reset by a personal computer.

In the embodiment shown, deflection lever arm 42 is approximately seven inches in length and the mechanical advantage/gear ration of gearbox 44 is from approximately 60:1 to approximately 80:1. However, it is to be understood that the present invention can be alternately configured with a deflection lever arm having a different length and a gearbox having a different mechanical advantage. In such an embodiment, the calibration factor required to display deflection in a unit of measurement, such as inches, is calculated accordingly.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. An apparatus for measuring the deflection of a belt in an electrophotographic printing machine from a zero-deflection position, said apparatus comprising:

an elongate arm member having a first end and a second end, said second end configured for engaging and being displaced by said belt, a gearbox having a plurality of gears interconnected into a gear arrangement, a gearbox shaft rotatable by said gear arrangement, said arm member coupled to said gear arrangement, said gear arrangement transferring displacement of said second end of said arm member to rotation of said gearbox shaft;

an encoder associated with said gearbox shaft, said encoder including at least one encoder output, said encoder sensing rotation of said gearbox shaft and issuing a plurality of electrical pulses on said at least one encoder output, said plurality of electrical pulses being indicative of a magnitude and a direction of rotation of said gearbox shaft, and a counter including at least one counter input, said at least one counter input electrically interconnected with a corresponding one of said at least one encoder output, said counter counting said electrical pulses.

2. The apparatus of claim 1, further comprising a display, said display being electrically interconnected with said counter and displaying at least one of a number and a direction, said number and direction respectively corresponding to the magnitude and direction of rotation of said gearbox.

3. The apparatus of claim 2, wherein said display is integral with said counter.

4. The apparatus of claim 1, further comprising: an output shaft interconnected with said gearbox shaft such that rotation of said gearbox shaft is transferred to rotation of said output shaft.

5. The apparatus of claim 4, wherein said encoder is disposed in association with and senses rotation of said output shaft.

6. An electrophotographic printing machine, comprising:

a belt having a photoconductive surface and a bottom surface opposite said photoconductive surface, said belt having a zero-deflection position, at least one transfer roller adjustably disposed relative to and for engaging said photoconductive surface; and an apparatus for measuring deflection of said belt, said apparatus comprising:

an elongate arm member having a first end and a second end, said second end engaging said bottom surface of said belt;

a gearbox having a plurality of gears interconnected into a gear arrangement, a gearbox shaft rotatable by said gear arrangement, said arm member coupled to said gear arrangement, said gear arrangement transferring displacement of said second end of said arm member to rotation of said gearbox shaft;

an encoder associated with said gearbox shaft, said encoder including at least one encoder output, said encoder sensing rotation of said gearbox shaft and issuing a plurality of electrical pulses on said at least one encoder output, said plurality of electrical pulses being indicative of a magnitude and a direction of rotation of said gearbox shaft; and a counter including at least one counter input, said at least one counter input electrically interconnected with a corresponding one of said at least one encoder output, said counter counting said electrical pulses.

7. The apparatus of claim 6, further comprising a display, said display being electrically interconnected with said counter and displaying at least one of a number and a direction, said number and direction respectively corresponding to a magnitude and direction of rotation of said gearbox.

8. The apparatus of claim 7, wherein said display is integral with said counter.

9. The apparatus of claim 6, further comprising:

an output shaft interconnected with said gearbox shaft such that rotation of said gearbox shaft is transferred to rotation of said output shaft.

10. The apparatus of claim 9, wherein said encoder is disposed in association with and senses rotation of said output shaft.

11. A method for setting the position of a transfer roller relative to a belt in an electrophotographic printing machine, said belt having a photoconductive surface and an underside disposed opposite said photoconductive surface, said belt being initially disposed in a zero-deflection position, said method comprising the steps of engaging said underside of the belt with one end of a deflection lever arm;

adjusting the position of said transfer roller relative to said belt such that said transfer roller engages said photoconductive surface and deflects said belt from said zero-deflection position, deflection of said belt being transferred to corresponding displacement of said second end of said deflection lever arm;

measuring the displacement of said deflection lever arm; and displaying the measured displacement of said second end of said deflection arm;

converting the displacement of said second end of said deflection lever arm to rotation of a shaft; and sensing a direction and a magnitude of the rotation of said shaft.

12. The method of claim 11, wherein said converting step comprises a gearbox coupled to a first end of said deflection lever arm, said gearbox converting the displacement of said second end of said deflection lever arm to rotation of a shaft.

13. The method of claim 11, wherein said sensing step comprises associating an optical encoder with said shaft.

* * * * *

UNITED STATES PATENT AND TRADEMARK OFFICE

CERTIFICATE OF CORRECTION

PATENT NO. : 6,584,289 B2

DATED : June 24, 2003

INVENTOR(S) : Robert S. Rejewski and Kenneth Friedrich

It is certified that error appears in the above-identified patent and that said Letters Patent is hereby corrected as shown below:

Column 2,
Line 22, the word -- modern -- is misspelled "modem."

Signed and Sealed this

Nineteenth Day of August, 2003

JAMES E. ROGAN
*Director of the United States Patent and Trademark Office*